(12) United States Patent
Bouchaala et al.

(10) Patent No.: US 10,845,283 B2
(45) Date of Patent: Nov. 24, 2020

(54) ACTIVE MEMS MICROBEAM DEVICE FOR GAS DETECTION

(71) Applicant: KING ABDULLAH UNIVERSITY OF SCIENCE AND TECHNOLOGY, Thuwal (SA)

(72) Inventors: Adam Bouchaala, Thuwal (SA); Nizar Jaber, Thuwal (SA); Mohammad Younis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 164 days.

(21) Appl. No.: 16/076,049

(22) PCT Filed: Mar. 30, 2017

(86) PCT No.: PCT/IB2017/051837
§ 371 (c)(1),
(2) Date: Aug. 7, 2018

(87) PCT Pub. No.: WO2001/716837
PCT Pub. Date: Oct. 5, 2017

(65) Prior Publication Data
US 2019/0383715 A1  Dec. 19, 2019

Related U.S. Application Data

(60) Provisional application No. 62/315,966, filed on Mar. 31, 2016.

(51) Int. Cl.
*G01N 5/02* (2006.01)
*G01N 29/02* (2006.01)
*G01N 29/036* (2006.01)

(52) U.S. Cl.
CPC ............. *G01N 5/02* (2013.01); *G01N 29/022* (2013.01); *G01N 29/036* (2013.01); *G01N 2291/015* (2013.01); *G01N 2291/0257* (2013.01)

(58) Field of Classification Search
None
See application file for complete search history.

(56) References Cited

U.S. PATENT DOCUMENTS

| 8,065,904 B1 | 11/2011 | Allendorf et al. |
| 2013/0047710 A1 | 2/2013 | Rhoads et al. |
| 2015/0153221 A1 | 6/2015 | Hentz et al. |

FOREIGN PATENT DOCUMENTS

WO  2002090246 A2  11/2002

OTHER PUBLICATIONS

International Search Report in related International Application No. PCT/1132017/051837, dated Jun. 9, 2017.
(Continued)

*Primary Examiner* — Harshad R Patel
*Assistant Examiner* — Nigel H Plumb
(74) *Attorney, Agent, or Firm* — Patent Portfolio Builders PLLC

(57) ABSTRACT

A sensing method includes operating a microelectromechanical system (MEMS) microbeam device; measuring structural vibrations of the MEMS microbeam device over time; selecting an operational frequency $f_{operating}$ that is applied to the MEMS microbeam device, where the operational frequency $f_{operating}$ is different from a jump frequency $f_{Jump}$ of the MEMS microbeam device, and the MEMS microbeam device is characterized by a frequency response curve that has a linear part and a softening or hardening part, and the operational frequency $f_{operating}$ is selected to be in the linear part; conducting an analysis of the structural vibrations of the MEMS microbeam device based on a linear (Continued)

equation that relates an amplitude of the structural vibrations to a frequency from the linear part; and detecting a frequency difference between the operational frequency $f_{operating}$ and the jump frequency $f_{Jump}$ of the MEMS microbeam device based on the linear equation.

16 Claims, 16 Drawing Sheets

(56) References Cited

OTHER PUBLICATIONS

Jaber, N., et al., "Higher Order Modes Excitation of Electrostatically Actuated Clamped-Clamped Microbeams: Experimental and Analytical Investigation," Journal of Micromechanics and Microengineering, Jan. 6, 2016, vol. 26, pp. 1-11.
Khater, M.E., et al., "Dynamic Actuation Methods for Capacitive MEMS Shunt Switches," Journal of Micromechanics and Microengineering, Feb. 8, 2011, vol. 21, pp. 1-12.
Written Opinion of the International Searching Authority in related International Application No. PCT/IB2017/051837, dated Jun. 9, 2017.
Zhuang, J.-L., et al., "Patterned Deposition of Metal-Organic Frameworks onto Plastic, Paper, and Textile Substrates by Inkjet Printing of a Precursor Solution," Advanced Materials, Sep. 2013, vol. 25, pp. 4631-4635.
Hiller, T., et al., "System Identification, Design, and Implementation of Amplitude Feedback Control on a Nonlinear Parametric MEM Resonator for Trace Nerve Agent Sensing," Journal of Microelectromechanical Systems, vol. 24, No. 5, Oct. 2015 (Manuscript Published Feb. 23, 2015), pp. 1275-1284.
Kumar, V., et al., "Bifurcation-based mass sensing using piezoelectrically-actuated microcantilevers," Applied Physics Letters, vol. 98, No. 15, 2011 (Published Online Apr. 13, 2011), pp. 153510-1-153510-3 (4 pages).
Kumar, V., et al., "Modeling, Analysis, and Experimental Validation of a Bifurcation-Based Microsensor," Journal of Microelectromechanical Systems, vol. 21, No. 3, Jun. 2012 (Manuscript Published Feb. 3, 2012), pp. 549-558.
Younis, M.I., et al., "Exploration of New Concepts for Mass Detection in Electrostatically-Actuated Structures Based on Nonlinear Phenomena," Journal of Computational and Nonlinear Dynamics, vol. 4, Apr. 2009 (Published Online Mar. 10, 2009), pp. 021010-1-021010-15.
Zhang, W., et al., "Application of parametric resonance amplification in a single-crystalsilicon micro-oscillator based mass sensor," Sensors and Actuators A: Physical, vol. 122, 2005 (Available Online Mar. 3, 2005), pp. 23-30.

ACTIVE MEMS MICROBEAM DEVICE FOR GAS DETECTION

CROSS REFERENCE TO RELATED APPLICATIONS

This application claims priority to, and the benefit of, U.S. provisional application entitled "Active MEMS Devices for Gas Detection" having Ser. No. 62/315,966, filed Mar. 31, 2016, which is hereby incorporated by reference in its entirety.

BACKGROUND

Microelectromechanical systems (MEMS) are attractive for use in various applications and fields due to their capabilities and performance. MEMS sensors have broad uses among fields, such as medicine, aerospace, automotive, public safety, and security. The importance of small mass detection and measurement, for example, has led to the development of sophisticated microstructure designs with high sensitivity reaching femtogram resolution. The need for accurate and highly sensitive microsensors has also led to cutting edge research biology and chemistry to detect very small mass quantities.

SUMMARY

According to the embodiments, electrostatically actuated clamped-clamped microbeams coated with a sensitive chemical Metal-Organic Framework (MOF) layer, such as HKUST-1 or another MOF coating, act as a gas-triggered sensor or switch. The proposed electromechanical device can work as both a sensor to track changes in frequency before a sudden change in amplitude and as an electrical switch (or actuator) activated upon gas adsorption beyond certain threshold. A frequency shift is demonstrated that can be tracked over a nonlinear regime using a linearly fitted upper branch in hardening behavior. The quantity of mass attached on the microbeam can be approximated using the responsivity of the microbeam calculated in the linear regime. Empirical results described herein include the mass threshold of an example clamped-clamped microbeam.

As described in further detail below, clamped-clamped microbeams can also be used to track frequency shift in real time based on the amount of mass attached on the surface of the sensor. The embodiments can track the frequency shift until reaching a specific threshold to trigger a switch. In that context, a clamped-clamped microbeam resonator can be electrically and/or communicatively coupled to a microcontroller or other suitable circuitry to perform frequency detection and switching quickly.

Other systems, methods, features, and advantages of the present disclosure will be apparent to one having ordinary skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

For a more complete understanding of the embodiments described herein and the advantages thereof, reference is now made to the following description, in conjunction with the accompanying figures briefly described below.

Figure 1:
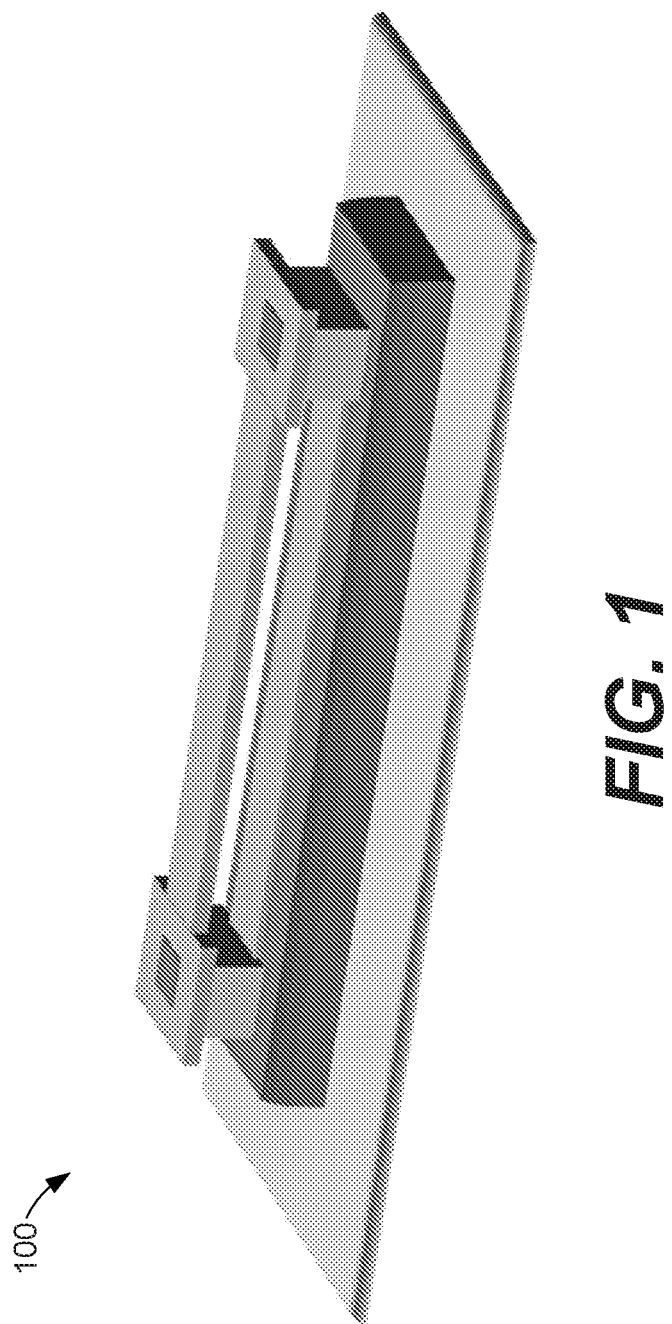
FIG. 1 illustrates an example rendering of an electrostatically actuated clamped-clamped microbeam according to various embodiments described herein.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. Moreover, in the drawings, similar reference numerals between figures designate like or corresponding, but not necessarily the same, elements.

DETAILED DESCRIPTION

Sensors and active switches for applications in gas detection and other fields are described. The devices are based on the softening and hardening nonlinear response behaviors of micro-machined clamped-clamped microbeams. In that context, embodiments of gas-triggered microelectromechanical systems (MEMS) microbeam sensors and switches are described. The microbeam devices can be coated with a Metal-Organic Framework to achieve high sensitivity. For gas sensing, an amplitude-based tracking algorithm can be used to quantify an amount of gas captured by the devices according to frequency shift. Noise analysis is also conducted according to the embodiments, which shows that the microbeam devices have high stability against thermal noise. The microbeam devices are also suitable for the generation of binary sensing information for alarming, for example.

Figure 2A:
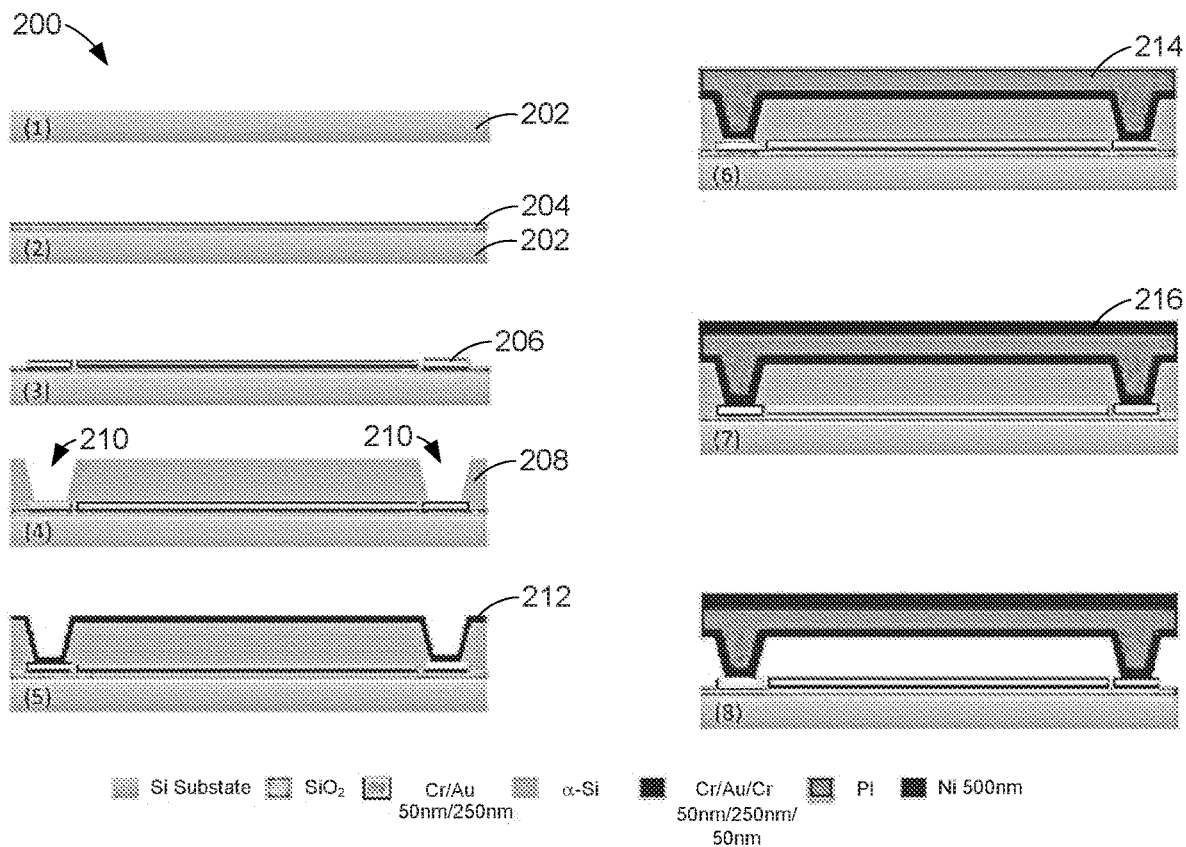
FIG. 2A illustrates a microbeam fabrication process according to various embodiments described herein.

FIG. 1 illustrates an example rendering of an electrostatically actuated clamped-clamped microbeam 100 according to various embodiments described herein. As to fabricating an example microbeam similar to the microbeam 100, FIG. 2A illustrates a microbeam fabrication process 200. Referring to FIG. 2A-1, the process 200 starts with a silicon wafer 202 of suitable size (e.g., 4, 6, 8, etc. inch silicon wafer). In FIG. 2A-2, a silicon dioxide insulation layer 204 is deposited upon the silicon wafer 202. As shown in FIG. 2A-3, the next step is to sputter a lower electrode 206, which can be composed of a layer of gold and chrome, among other suitable metals, at a thicknesses of about 250 nm/50 nm. Other metals and thicknesses can be used for the lower electrode in various embodiments.

Next, as shown in FIG. 2A-4, amorphous silicon is deposited on top of the layer of gold and chrome to form a sacrificial layer 208. Two anchors 210 are etched in the amorphous silicon layer to connect the upper electrode with the lower connections as also shown in FIG. 2A-4. In FIG. 2A-5, the upper electrode 212 is fabricated with chrome/gold/chrome layers of thicknesses 50 nm/250 nm/50 nm, for example, although other suitable metals and/or thicknesses can be used. Then, in FIG. 2A-6, 6 μm of polyimide 214 is spun and cured at gradually increasing temperature from 150° C. to 350° C. in 50 minutes and then held at 350° C. for 30 minutes to form a structural layer. In other embodiments, other thicknesses of the polyimide 214 can be spun and cured at other temperatures and over other periods of time. In FIG. 2A-7, a nickel layer 216 of suitable thickness (e.g., 500 nm) is sputtered on the top surface of the polyimide 214 in order to protect the microbeam during reactive ion etching. As shown in FIG. 2A-8, the sacrificial layer 208 is removed using reactive ion etching or another suitable method.

Figure 2B:
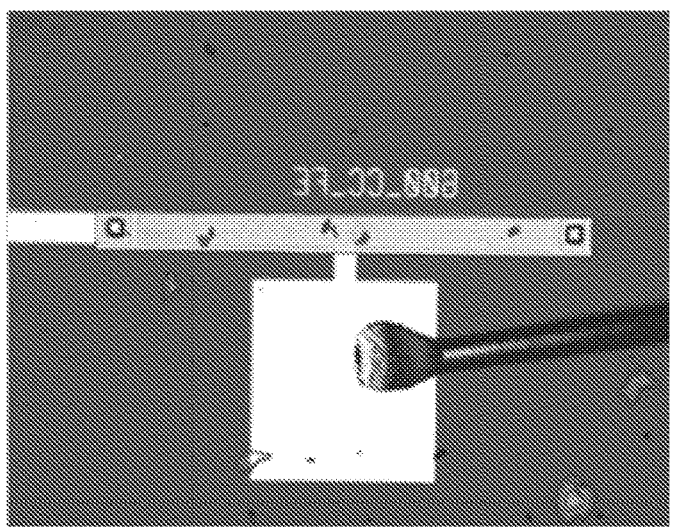
FIG. 2B illustrates an optical image of an example microbeam fabricated according to the process shown in FIG. 2A.

The geometrical properties of an example microbeam fabricated according to the process 200 shown in FIG. 2A are shown below in Table 1, and FIG. 2B illustrates an optical image of an example microbeam fabricated according to the process 200 shown in FIG. 2A.

TABLE 1

Geometrical Properties of an Example Microbeam

| Symbol | Quantity | Dimensions |
|---|---|---|
| L | Length | 600 [μm] |
| H | Thickness | 6.85 [μm] |
| B | Width | 50 [μm] |

In other aspects of the embodiments, a microbeam fabricated according to the process 200 shown in FIG. 2A is coated with a MOF solution. MOFs are compounds consisting of metal ions or clusters coordinated to organic molecules to form one-, two-, or three-dimensional structures that can be porous. In one embodiment, a $Cu_3(btc)_2$ MOF, where btc is 1,3,5-benzenetricarboxylate, also known as HKUST-1, is used for the coating. The HKUST-1 can be prepared using the method described in "Patterned Deposition of Metal-Organic Frameworks onto Plastic, Paper, and Textile Substrates by Inkjet Printing of a Precursor Solution," by Jin-Liang Zhuang, Deniz Ar, Xiu-Jun Yu, Jin-Xuan Liu, and Andreas Terfort, Advanced Materials, Vol. 25 (2013) pp. 4631-4635, although other MOFs and methods of MOF preparation can be relied upon among the embodiments.

Figure 3A:
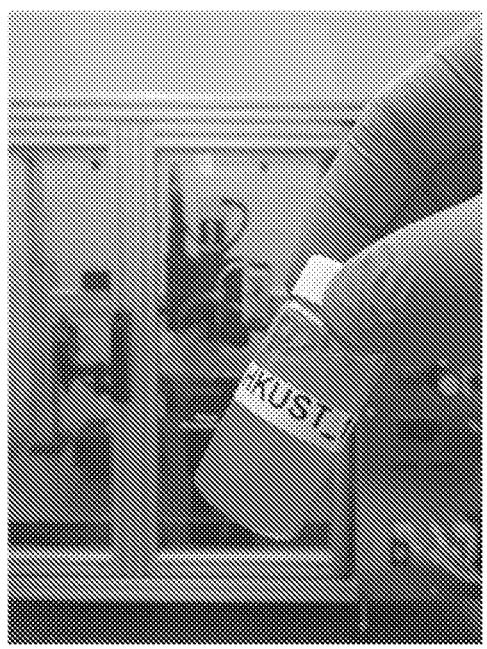
FIG. 3A illustrates a bottle of $Cu_3(btc)_2$ metal-organic framework according to various embodiments described herein.
Figure 3B:
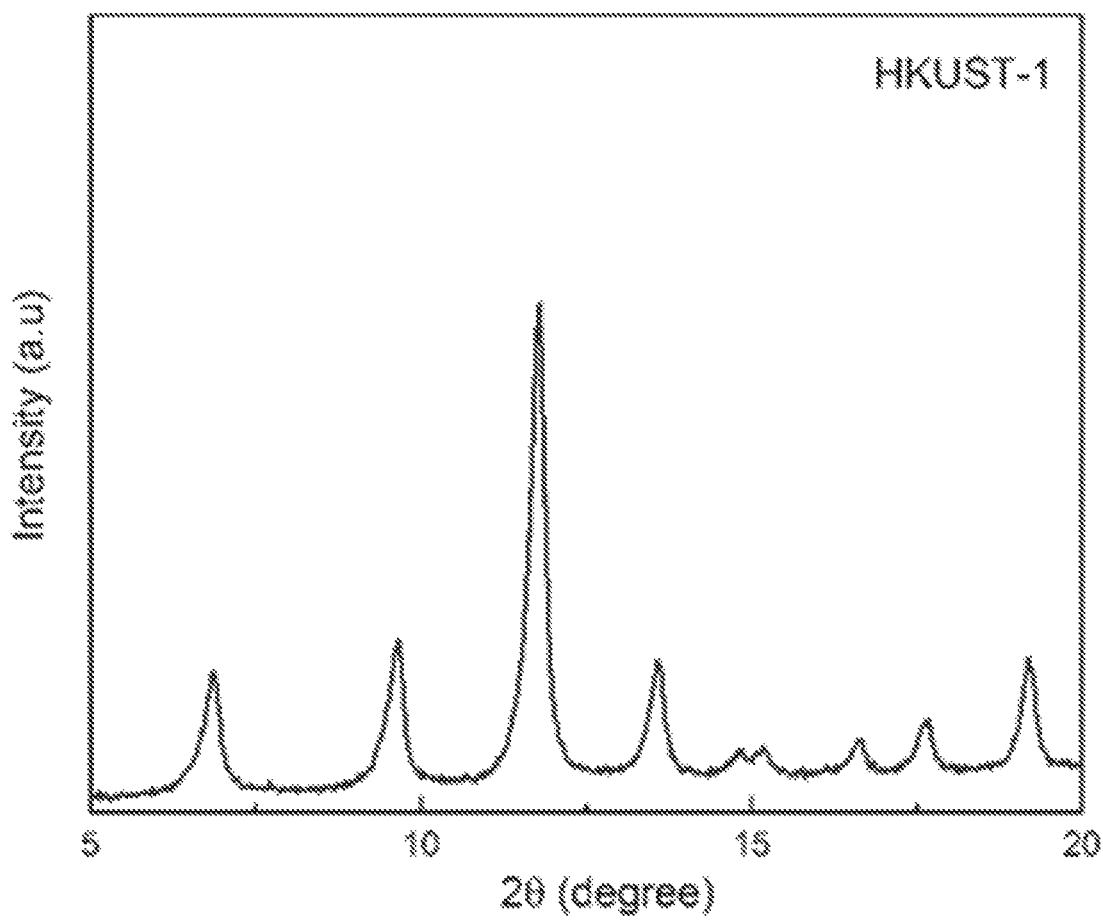
FIG. 3B illustrates powder X-ray diffraction results performed on the example microbeam shown in FIG. 2B after being coated with the metal-organic framework shown in FIG. 3A.

FIG. 3A illustrates a bottle of $Cu_3(btc)_2$ MOF, also known as HKUST-1, according to various embodiments described herein. The HKUST-1 has a light blue color due to the existence of the ethylene glycol. The MOF solution can be useful for several months after it has been prepared. In one embodiment, an inkjet printer can be used to coat the microbeam shown in FIG. 3A (or other microbeam or similar MEMS device) with the HKUST-1 MOF solution. An inkjet printer having a nozzle of 20 μm in diameter, for example, can be used, although the nozzle can be larger or smaller depending upon the desired thickness of the HKUST-1 coating. To ensure the evaporation of the solvent in the HKUST-1 and avoid shifting in real time measurements upon gas exposure, the microbeam can also be exposed to a flow of nitrogen for a sufficient time. In other embodiments, however, the nitrogen exposure can be skipped or omitted. To confirm the existence of the HKUST-1 on the surface of the microbeam, powder X-ray diffraction (PXRD) was performed, and the results are shown in FIG. 3B.

As described in detail below, the HKUST-1-coated microbeam can be used as a gas detector, sensor, and/or switch. To determine the minimum detectable frequency and, thus, the minimum detectable mass of the gas sensor at a given temperature, a noise analysis was performed in different conditions. The frequency shift due to thermal fluctuations around the resonator can be related to the phase variation at a given frequency. In that context, an Agilent 4294A precision impedance analyzer, connected to a PC with a GPIB interface from National Instruments, was used for data acquisition to electrically characterize the microbeam.

Figure 4A:
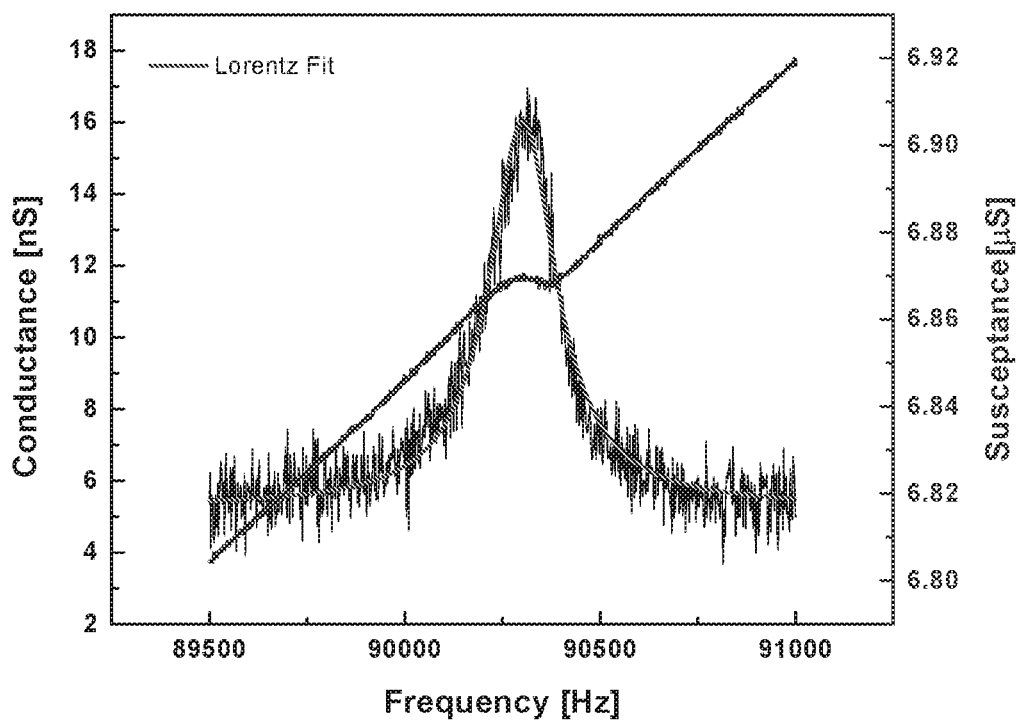
FIGS. 4A-4C illustrate noise analysis graphs at a first pressure, including conductance as a function of frequency, phase as a function of frequency, and variation of phase at a fixed frequency as a function of time, respectively, for an example microbeam according to various embodiments described herein.
Figure 4B:
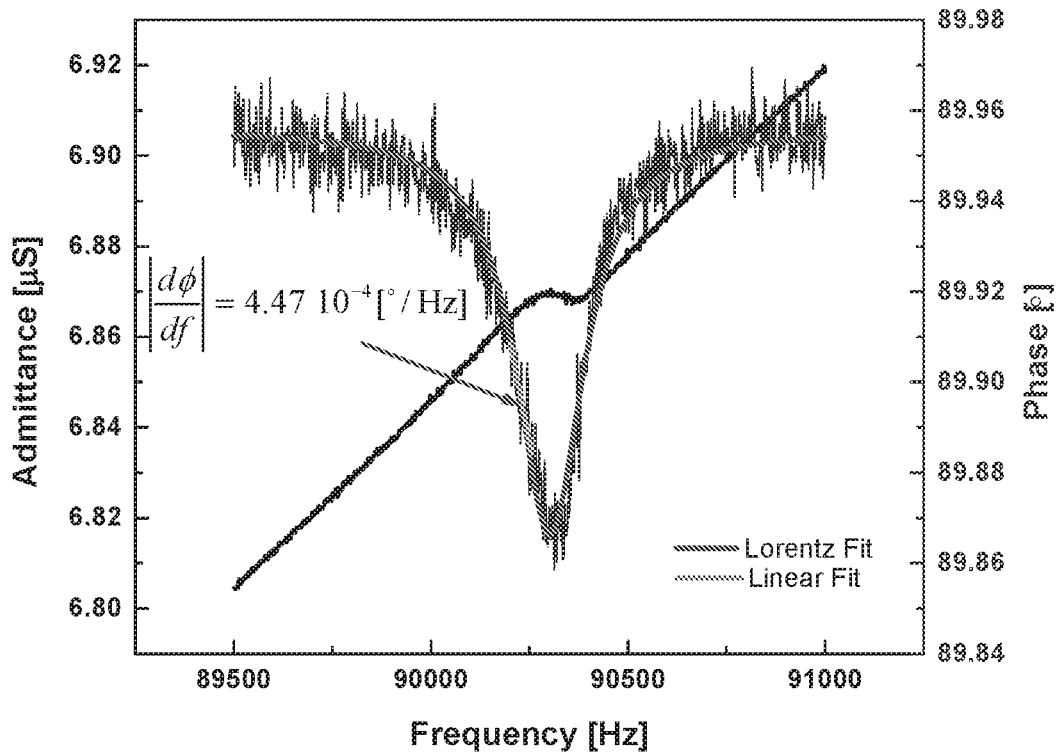
Figure 4C:
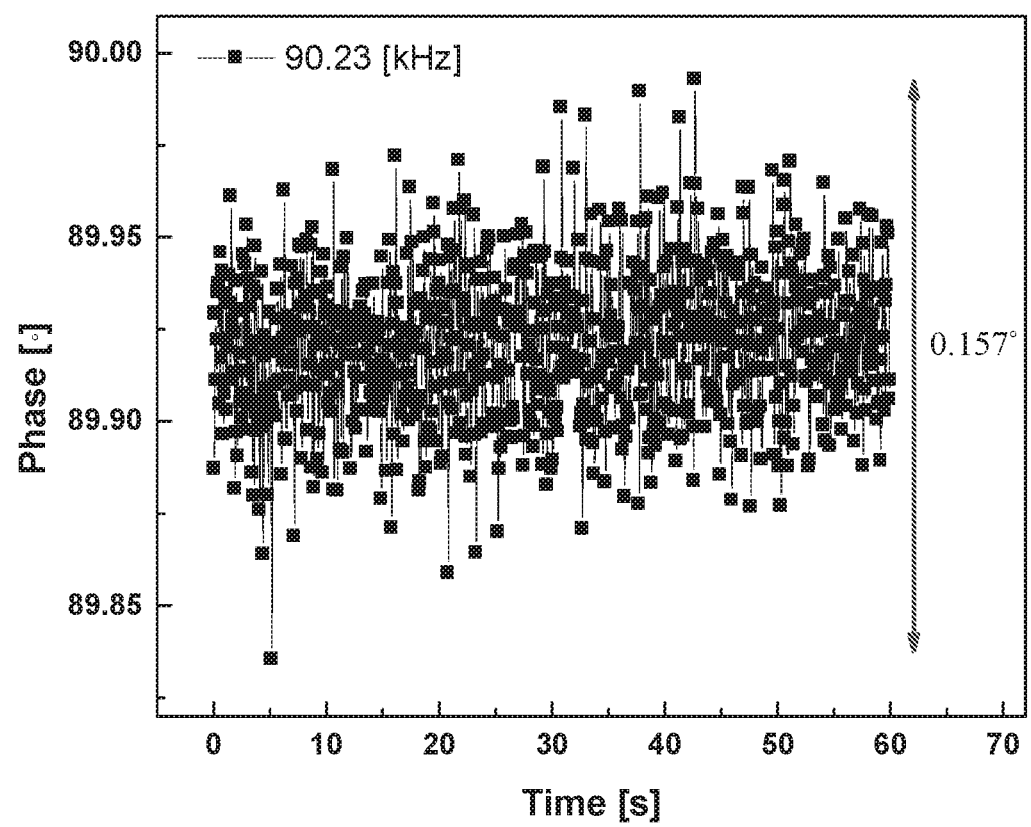

FIGS. 4A-4C illustrate noise analysis graphs at a first pressure, including conductance as a function of frequency, phase as a function of frequency, and variation of phase at a fixed frequency as a function of time, respectively, for an example microbeam. More particularly, FIG. 4A illustrates conductance as a function of frequency at 200 mTorr with VDC=1.5V and VAC=1V. The constant excitation frequency is selected to be 90.23 kHz at the middle of the linearly fitted (e.g., Lorentz fitted) zone in the phase response curve in FIG. 4A, where the slope is found to be equal to |dφ/df|=4.47

10⁻⁴[°/Hz]. FIG. 4B illustrates phase as a function of frequency at 200 mTorr with VDC=1.5V and VAC=1V. Finally, FIG. 4C illustrates variation of the phase over time at the fixed frequency of 90.23 kHz. In other words, FIG. 4C shows the phase evolution as a function of time at a fixed frequency. The phase noise is calculated to be $d\phi=0.157°$, which leads to a frequency shift of $\delta f_{noise}^{200\ mTorr}=d\phi/|d\phi/df|=351.23$ [Hz].

Figure 5A:
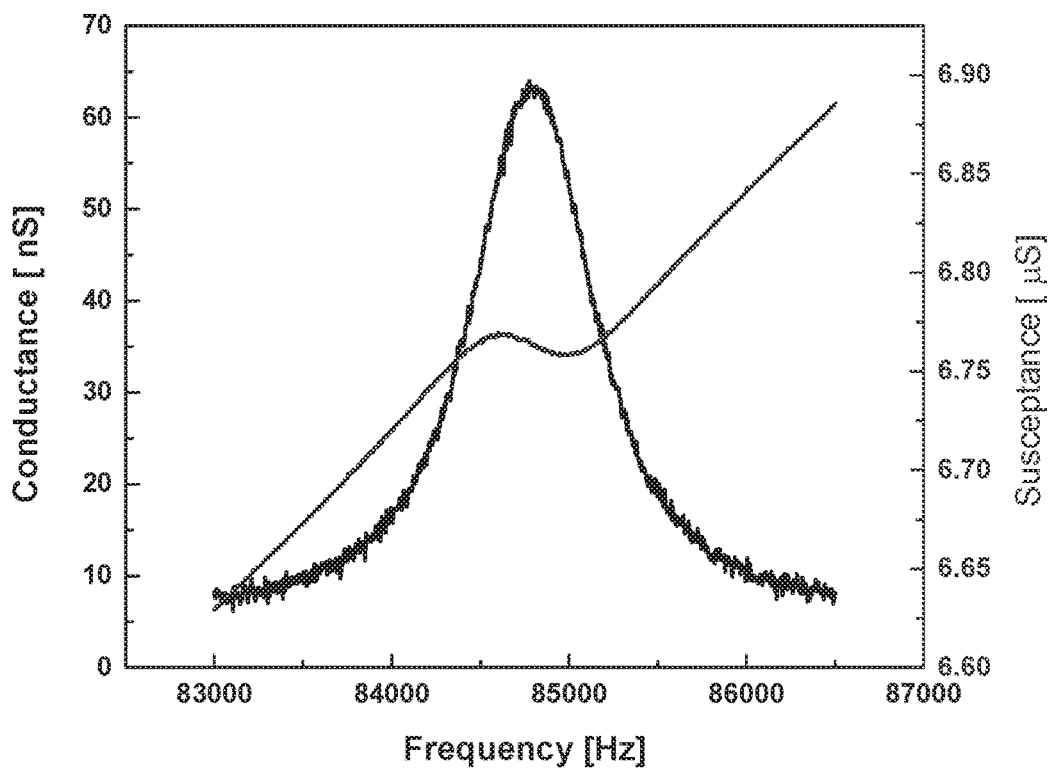
FIGS. 5A-5C illustrate noise analysis graphs at a second pressure, including conductance as a function of frequency, phase as a function of frequency, and variation of phase at a fixed frequency as a function of time, respectively, for an example microbeam according to various embodiments described herein.
Figure 5B:
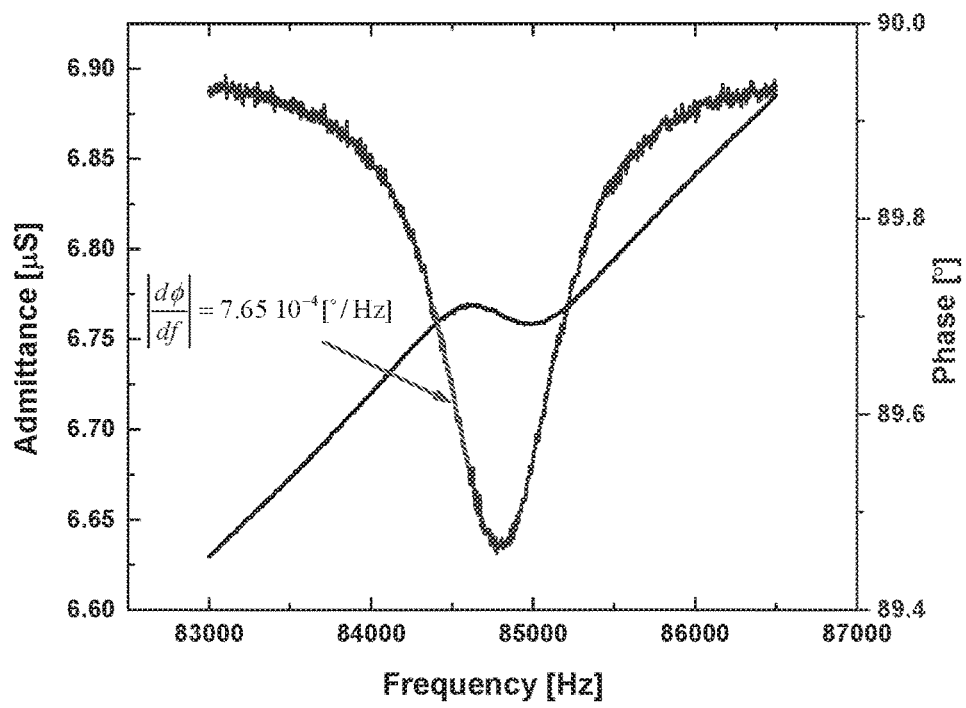
Figure 5C:
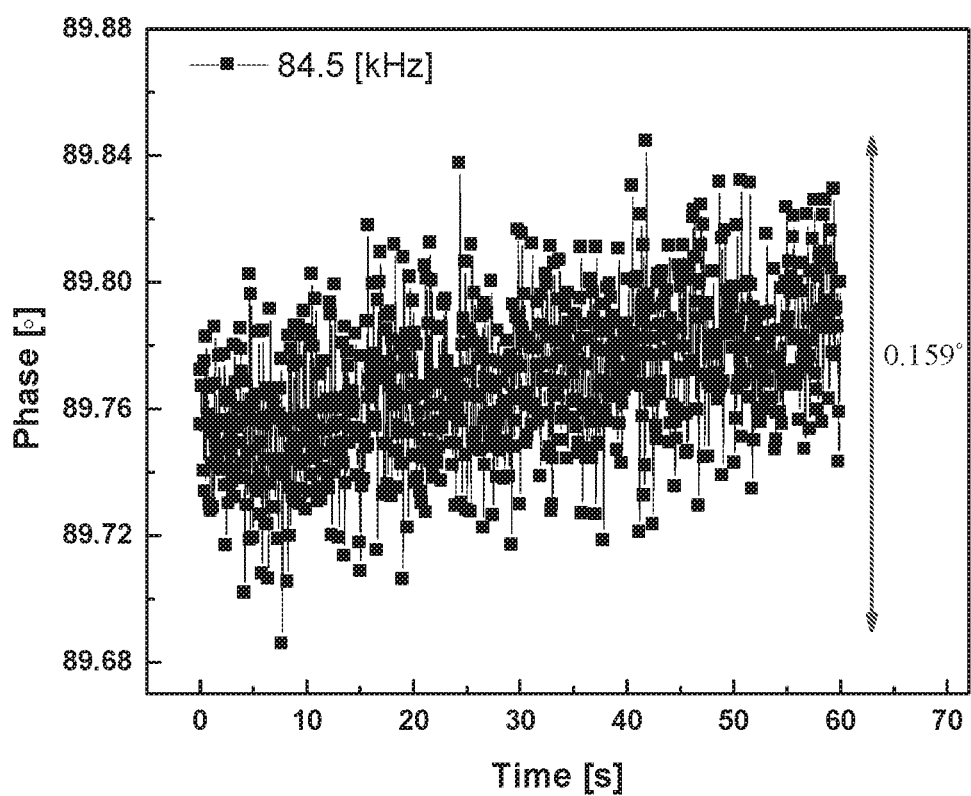

FIGS. 5A-5C illustrate noise analysis graphs at a second pressure, including conductance as a function of frequency, phase as a function of frequency, and variation of phase at a fixed frequency as a function of time, respectively, for an example microbeam. More particularly, FIG. 5A illustrates conductance as a function of frequency at 3.3 Torr with $V_{DC}$=7V and $V_{AC}$=1V. The constant excitation frequency is selected to be 84.5 kHz at the middle of the linearly fitted zone in the phase response curve in FIG. 5A. FIG. 5B illustrates phase as a function of frequency at 3.3 Torr with VDC=7V and VAC=1V. Finally, FIG. 5C illustrates variation of the phase over time at the fixed frequency of 84.5 kHz.

With regard to FIGS. 5A-5C, the same noise analysis procedure detailed above with reference to FIGS. 4A-4C was performed at a pressure of 3.3 Torr, which is another example operating pressure for microbeam devices. Using linear fitting, the slope of the linear branch in FIG. 5B was determined to be $|d\phi/df|=7.65\ 10^{-4}$[°/Hz]. The phase variation for the constant frequency of 84.5 kHz was determined to be $d\phi=0.159°$, which leads to a frequency shift of $\delta f_{noise}^{3.3\ Torr}=d\phi/|df|=207.84$ [Hz].

In order to determine the linear relation between the induced frequency shift and mass added to the microbeam, the responsivity of the microbeam sensor can be calculated as:

$$\mathcal{R}^{-1} = \left|\frac{dm}{df}\right| = \frac{2m_{eff}}{f_{res,0V}}, \qquad (1)$$

where $f_{res,0V}$=86.8 [kHz] is the natural resonant frequency at $V_{DC}$=0V and $m_{eff}$ is the effective mass of the microbeam sensor represented as $m_{eff}=\alpha\ m$ and $\alpha=0.3965$ for the first natural frequency of the microbeam. The mass of the microbeam is m=510 [ng]. From Eq. (1), the responsivity of the sensor is $$\mathcal{R}_{1st}^{-1} = 4.65\left[\frac{pg}{Hz}\right].$$

Based on the calculated responsivity value, the minimum detectable mass $\delta m_{noise}$ can be calculated from the minimum detectable frequency $\delta f_{noise}$ due to thermal fluctuations. Based on Eq. (1), the relation between $\delta m_{noise}$ and $\delta f_{noise}$ can be written as $$\delta m_{noise} = \mathcal{R}^{-1}\delta f_{noise}. \qquad (2)$$

To further investigate the response of the coated microbeam, frequency response curves are generated for various voltage loads. A microbeam has two different sources of nonlinearities. The first comes from mid-plane stretching due to the geometry of the structure and the fixed anchors. This nonlinearity is cubic and is dominant for low DC voltages, which leads to hardening behavior. The second source of nonlinearity is due to the electrostatic force, which is quadratic in nature, and leads to softening behavior.

Figure 6A:
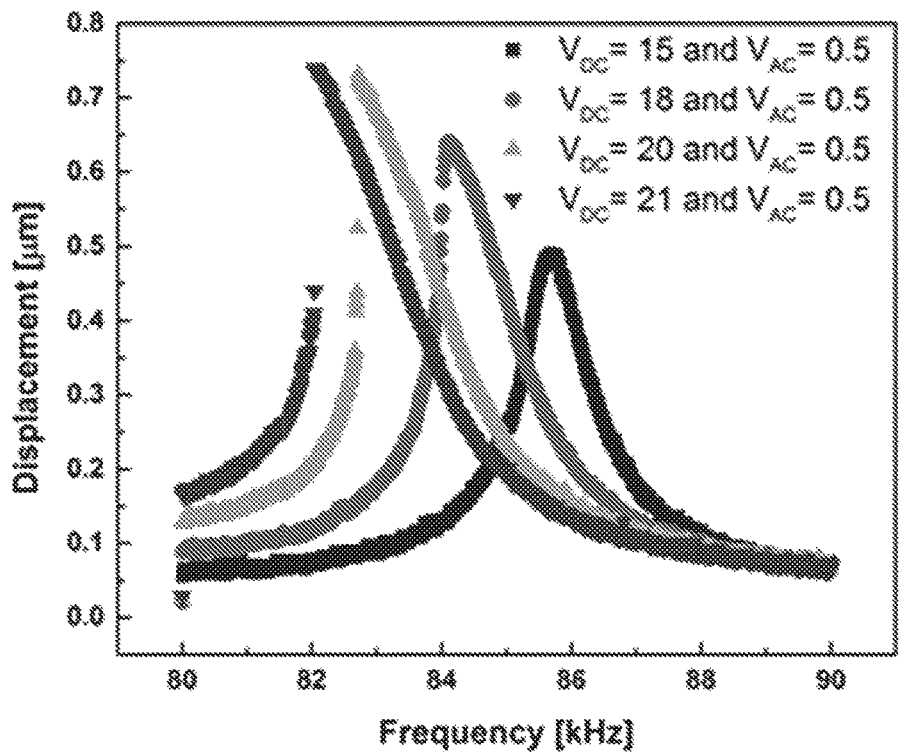
FIGS. 6A and 6B illustrate frequency response curves of an example microbeam for different DC voltages showing a transition from a linear to a softening behavior at a first pressure and for different AC voltages showing a transition from linear to hardening behavior at a second pressure, respectively, according to various embodiments described herein.
Figure 6B:
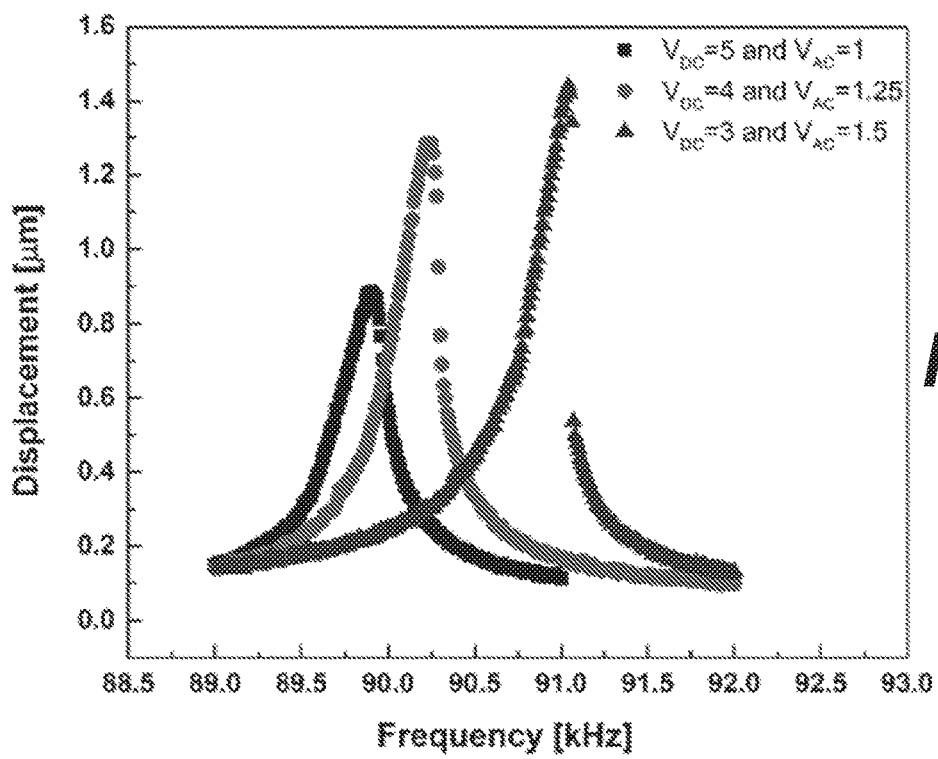

FIGS. 6A and 6B illustrate frequency response curves of an example microbeam for different DC voltages showing a transition from a linear to a softening behavior at a first pressure and for different AC voltages showing a transition from linear to hardening behavior at a second pressure, respectively, according to various embodiments described herein. More particularly, FIG. 6A shows a transition from a linear to a softening behavior at 3.3 Torr, and FIG. 6B shows a transition from linear to hardening behavior for different AC voltages at 220 mTorr.

The microbeam data shown in FIGS. 6A and 6B was captured at the same conditions of the gas sensing experiments described below, which is at a pressure of 3.3 Torr. In FIG. 6A, the black-square curve represents the frequency response of the beam in the linear regime. When increasing the DC voltage, softening behavior starts to appear. At $V_{DC}$=21V and $V_{DC}$=0.5V, a jump of 0.3 μm occurs between two saddle-nodes. The jump can be utilized for a gas switch trigger as described below. As described herein, this type of response can be called a jump-up switch.

As shown in FIG. 6B, increasing the AC voltage with a lower range of DC voltages leads to the appearance of the hardening behavior (i.e., the electrostatic nonlinearity is weaker). The advantage of a hardening frequency response curve is that, for a certain voltage load, an almost linear segment of the upper branch of the frequency-response curve appears before jumping to the second saddle-node bifurcation. This segment can be used and fitted into a linear equation to track the amount of mass attached on the surface of the microbeam. Almost a 1 μm jump in amplitude is shown in FIG. 6B with $V_{DC}$=3V and $V_{AC}$=1.5V. This type of response can be called a jump-down switch.

Figure 7:
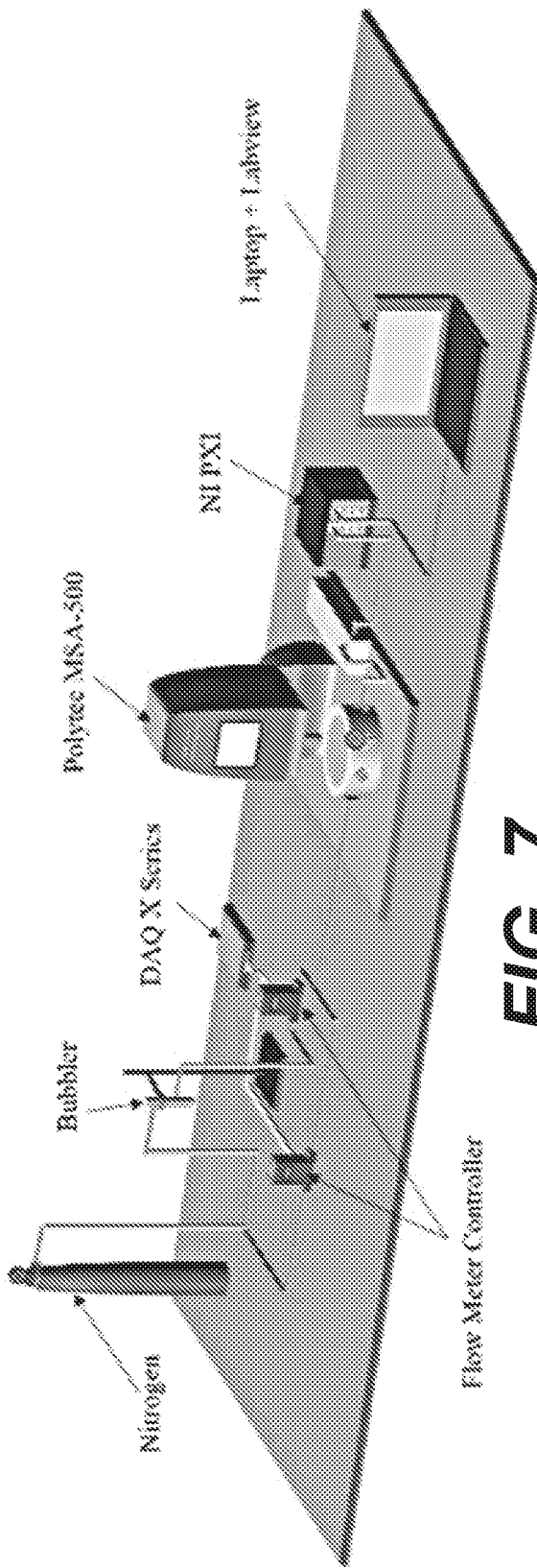
FIG. 7 illustrates an example diagram of a setup for optical gas sensing according to various embodiments described herein.

FIG. 7 illustrates an example diagram of a setup for optical gas sensing according to various embodiments described herein. FIG. 7 shows a diagram of the setup with a high pressure nitrogen source connected from one side to a bubbler, which contains the gas in liquid phase, and connected from the other side to a flow meter controller. The flow meter controller is configured to manage the nitrogen flow when purging is needed to restore the frequency of a microbeam device to its default value. The output of the bubbler is connected to a second flow meter to control the flow of the gas and the nitrogen mixture. A multifunction data acquisition card with a Labview program, for example, is utilized to control the flow rates. A vacuum chamber is connected to the gas setup and is placed under a laser Doppler vibrometer in order to measure the microbeam deflection (i.e., vibration frequency) in real time. The laser Doppler vibrometer can be any suitable instrument, such as a Polytec Micro System Analyzer, for example, or a similar tool for the analysis and visualization of structural vibrations and surface topography in MEMS micro structures. In other embodiments, any suitable instrument can be used to analyze and measure the structural vibrations and/or surface topography of the microbeams described herein.

Referring again to FIG. 7, in the example cases described below, the flow mass controller connected to the bubbler is set to allow 0.4 L/min. and 0.1 L/min. of flow for the jump-up and jump-down experiments, respectively. The last inlet of the vacuum chamber is connected to a pressure gauge to measure the pressure, which is equal to 3.3 Torr and 220 mTorr for the jump-up and jump-down experiments described below, respectively.

Figure 8A:
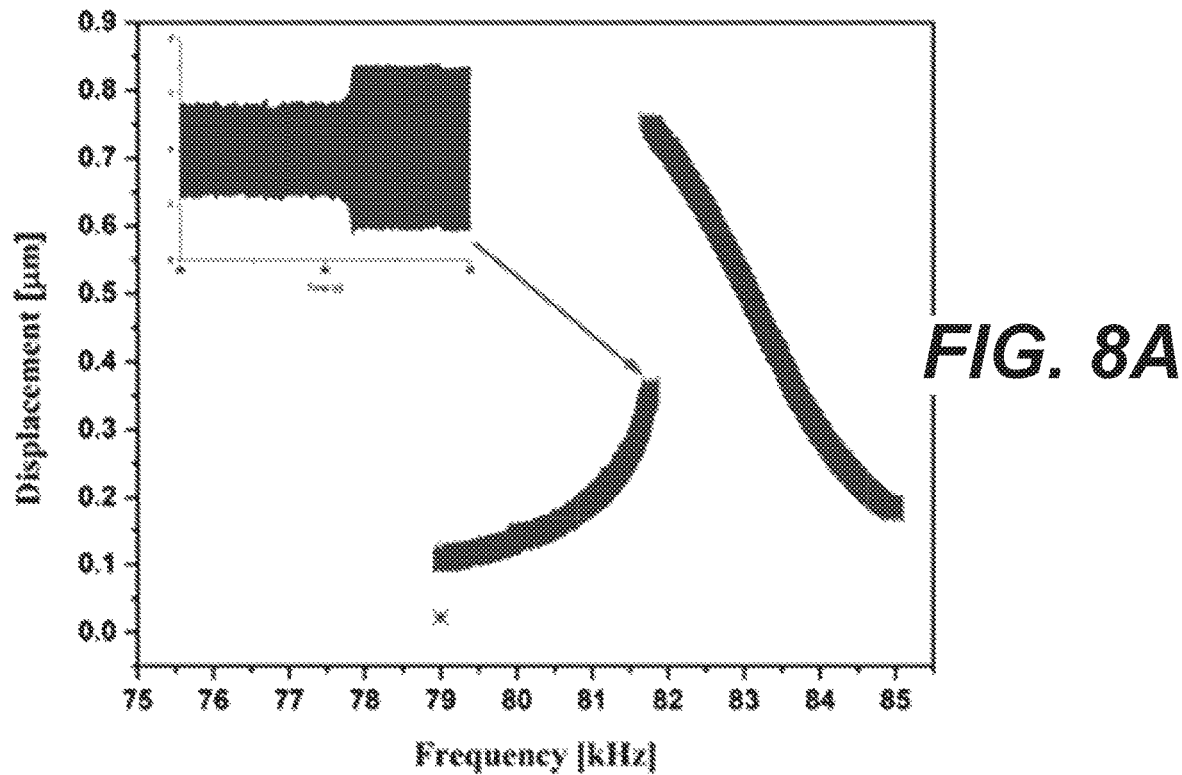
FIGS. 8A and 8B illustrate real time measurements of a frequency response jump before and after vapor exposure, including a jump up at 3.3 Torr and a jump down at 220 mTorr, respectively, according to various embodiments described herein.
Figure 8B:
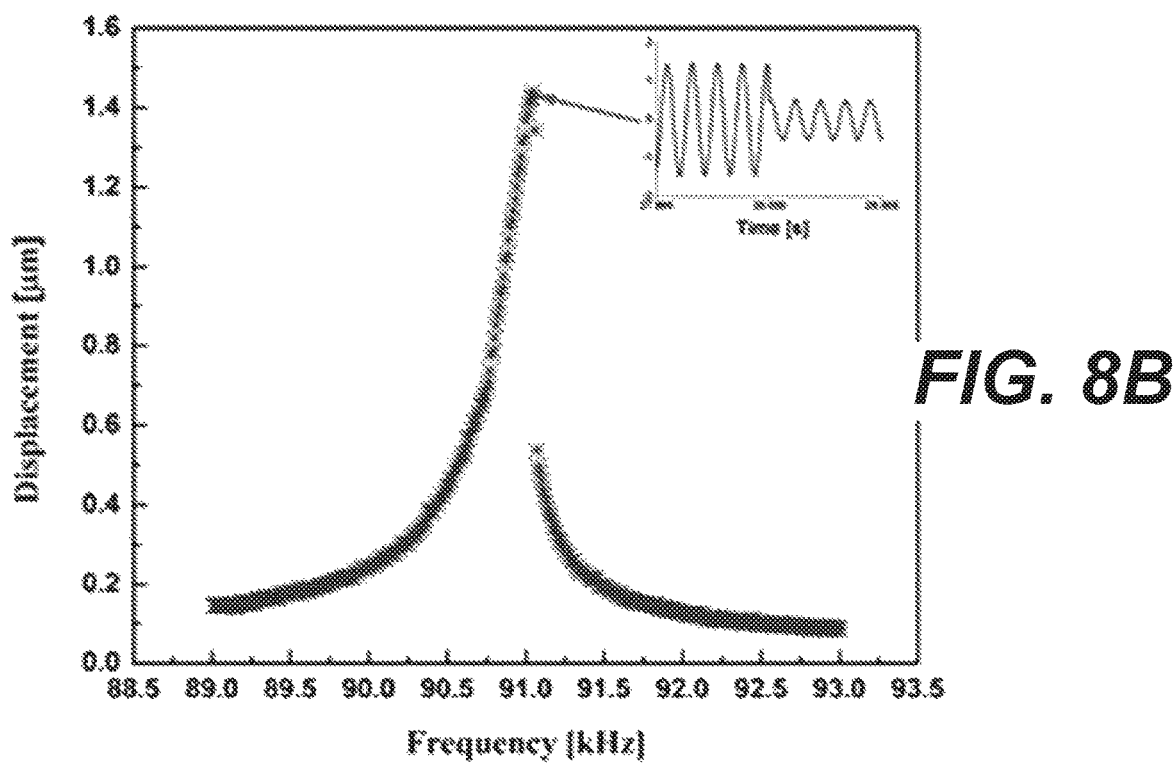

Using coated microbeam devices and the test setup described herein, a new technique to track frequency shift in the nonlinear regime due to mass detection is described. In that context, FIGS. 8A and 8B illustrate real time measurements of a frequency response jump before and after vapor exposure, including a jump up at 3.3 Torr and a jump down at 220 mTorr, respectively. Before taking the vapor measurements shown in FIGS. 8A and 8B, the coated microbeam was flushed with nitrogen to ensure that substantially all the solvent in the HKUST-1 MOF was flushed to start with a stable frequency reference.

The vapor sensing measurements were performed using a relatively small frequency step to increase the accuracy of the chosen frequency. The acquisition experiment is started using the NI PXI acquisition card before introducing the gas to fix the measurement reference. Then, the flow meter is fixed in order to get the same conditions of pressure and flow rate with the characterization measurements.

In FIG. 8A, the jump-up switch is demonstrated using real time measurements performed upon vapor introduction at a pressure of 3.3 Torr. The frequency response curve is shifted to a lower range of frequency and then, at a certain point, the displacement amplitude jumps up suddenly. This change in displacement amplitude is proposed not just for a highly-sensitive sensor but also for switching purposes, as described in further detail below. In FIG. 8B, the same microbeam is used, although another set of conditions are utilized. The flow rate is set to be 0.1 L/min, which leads the pressure of the vacuum chamber to be equal to 220 mTorr.

Figure 9A:
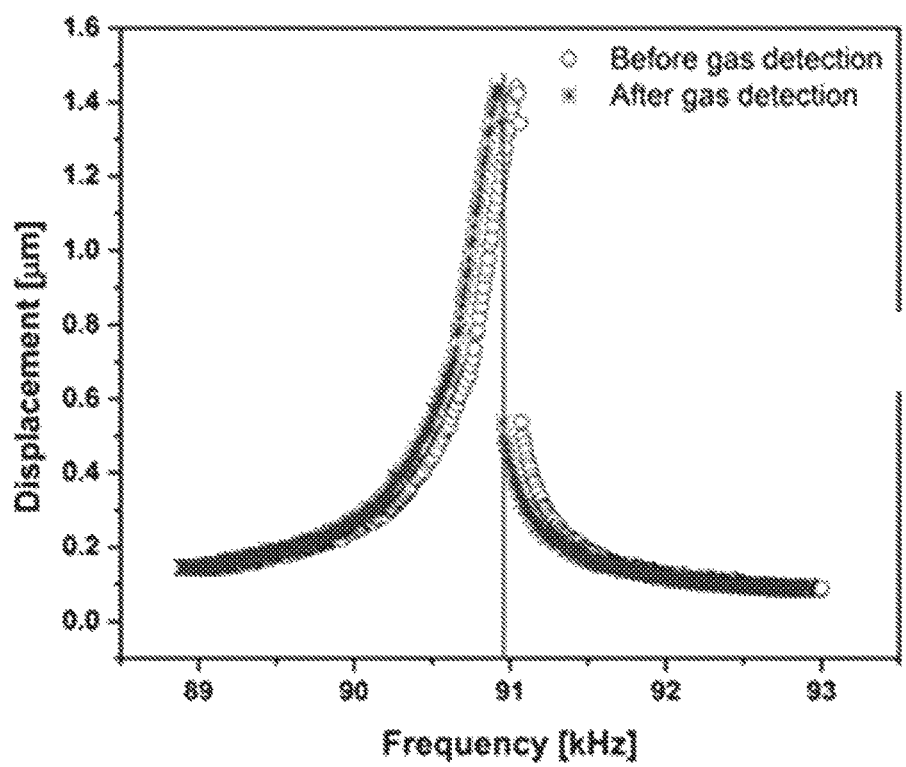
FIGS. 9A and 9B illustrate frequency responses before and after gas sensing and a linear fitting of the upper branch in the frequency response at 220 mTorr, respectively, according to various embodiments described herein.
Figure 9B:
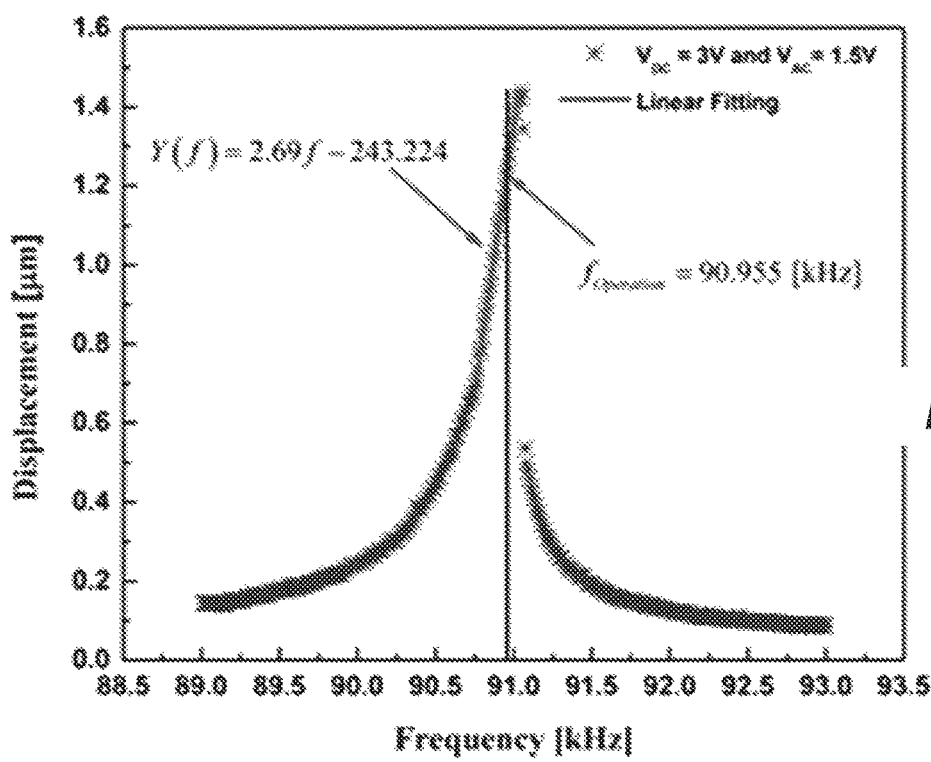

FIGS. 9A and 9B illustrate frequency responses before and after gas sensing and a linear fitting of the upper branch in the frequency response at 220 mTorr, respectively, according to various embodiments described herein. In FIG. 9A, the nonlinear frequency response is shown for $V_{DC}$=3 V and $V_{AC}$=1.5 V under a pressure of 220 mTorr. Using this set of conditions, the cubic nonlinearity dominates and the hardening behavior appears in the frequency response.

Next, an approximate technique to quantify a mass captured by a microbeam by linearly fitting the upper branch of the frequency response curve based on the hardening behavior is described. The concept relies on operating the resonator at a fixed frequency $f_{Operating}$ before the jump down regime in the frequency response curve. Then, at the fixed frequency $f_{Operating}$, the variation of the amplitude is tracked as the microbeam is exposed to vapor. Essentially, the exposure to vapor will increase the mass of the microbeam, thereby downshifting its natural frequency and, hence, the curve in FIG. 9B to lower values. This means that $f_{Operating}$ will correspond to a higher value of amplitude in the frequency response curve. This change in amplitude can be quantified and related/calibrated to the amount of captured mass.

Figure 10A:
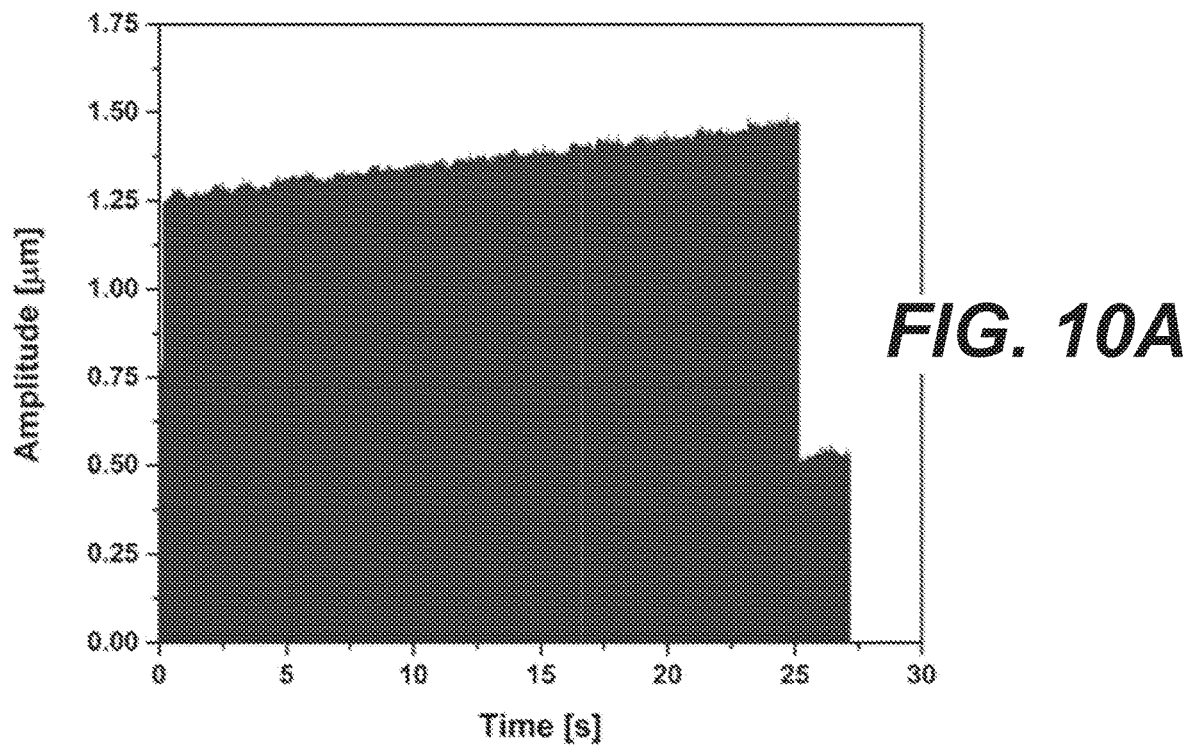
FIGS. 10A and 10B illustrate real time amplitude variation and frequency shift, respectively, as a function of time upon gas exposure according to various embodiments described herein.

As shown in FIG. 9B, using a linear fitting, the slope of the linear branch is determined, which represents the variation of the amplitude with respect to the frequency |dY/df|=2.69 [μm/Hz]. Exposing the microbeam to vapor leads to an increase in amplitude. This is further clarified in FIG. 10A, which shows a real time measurement of the microbeam mid-point deflection when exposed to water vapor. The amplitude of the fixed frequency is equal to before vapor exposure. After 25 seconds of vapor exposure, the amplitude of the point before the jump (B-jump) reaches $Y_{B-jump}$=1.48 [μm], then it jumps-down as shown in FIG. 10A.

The frequency shift as a function of time is important information to be determined in the dynamic-based sensor. As the variation of amplitude has been done in the linearly fitted regime, the calculated slope is used to determine the frequency shift as a function of time shown in FIG. 10B. The initial amplitude value can be subtracted from the amplitude variation and then divided by the calculated slope. Measuring the frequency shift as a function of time from FIG. 10B, Δf=85 Hz was found before reaching the jump zone.

Figure 10B:
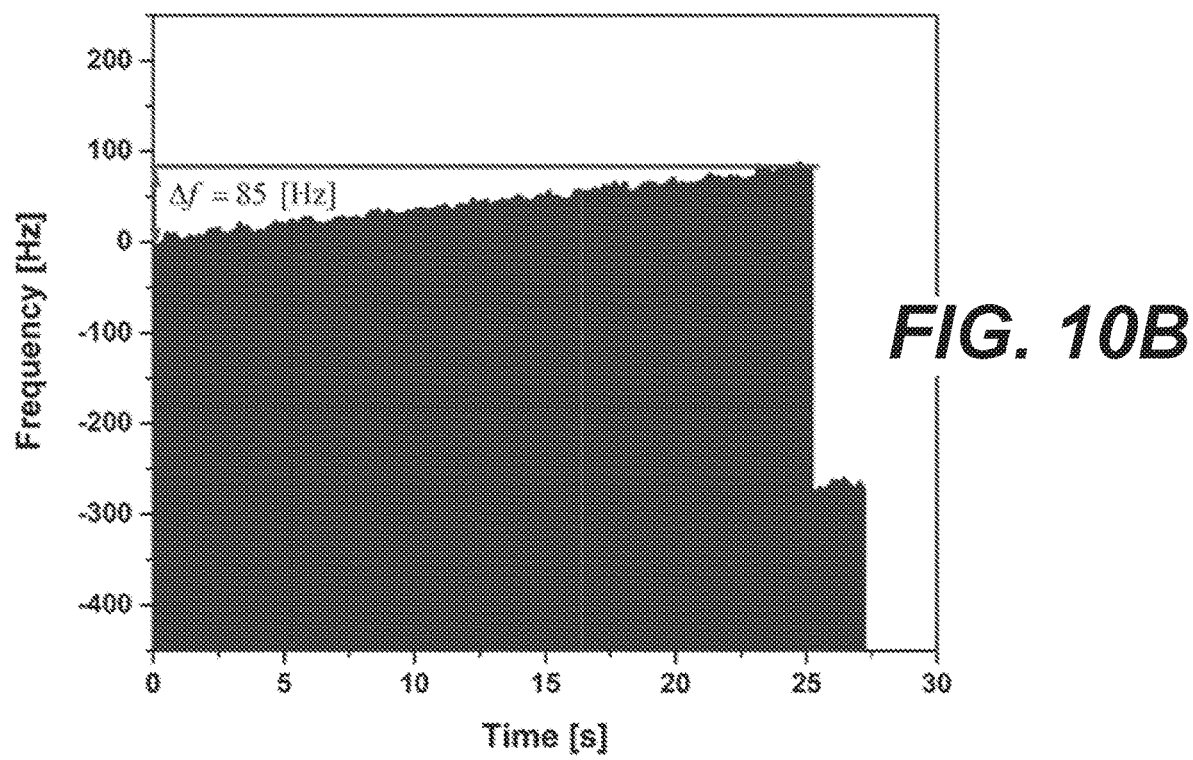

In order to check the accuracy of the calculations, the frequency shift coming from the real time measurement in FIG. 10B was compared with the frequency shift calculated from FIG. 9B, by subtracting the frequency of the point just before the jump $f_{B-Jump}$=91.045 [kHz] from the operating frequency $f_{Operation}$=90.955 [kHz]. The least calculated frequency is found to be equal to Δf=85.55 [Hz], which is very close to the calculated frequency shift using linear fitting.

Using Eq. (2), the amount of the added mass can be tracked in real time from the induced frequency shift shown in FIG. 10B. The total mass attached on the sensor before the activation of the switch is $\Delta m = \Re^{-1} \Delta f$=395 [pg].

Figure 11A:
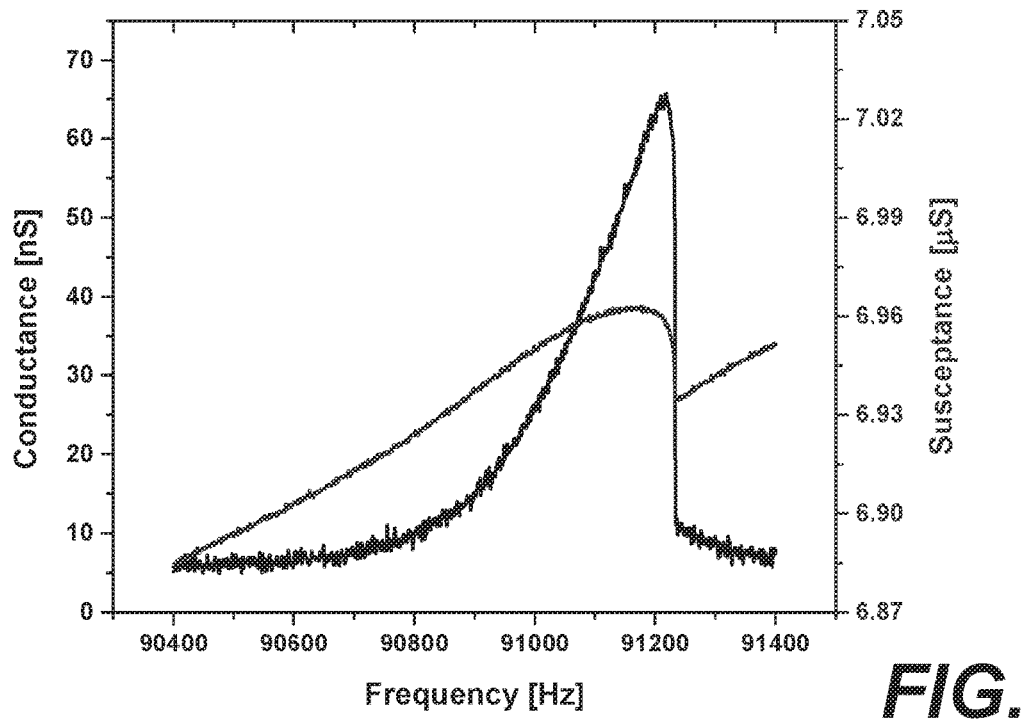
FIGS. 11A and 11B illustrate noise analysis graphs at a first pressure, including conductance as a function of frequency and phase as a function of frequency, respectively, according to various embodiments described herein.
Figure 11B:
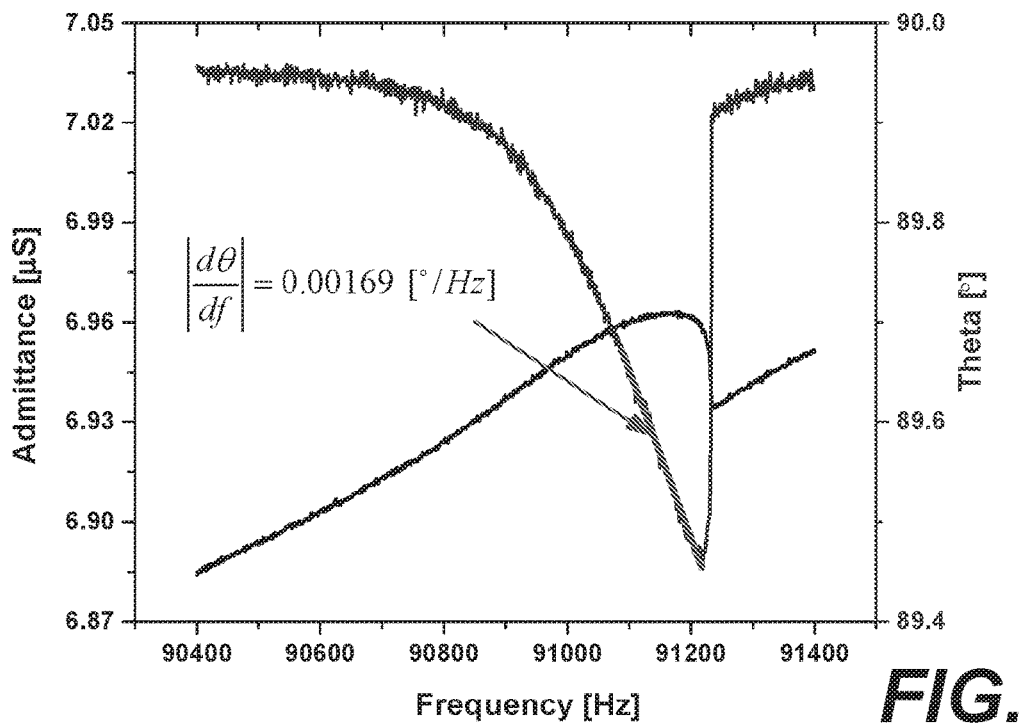

In order to verify the stability of the selected frequency, a noise analysis is performed at 200 mTorr pressure using electrical characterization. Due to the AC voltage limitations in the impedance analyzer, the value of $V_{AC}$ was set equal to 1V instead of 1.5V. The same DC voltage has been selected of the gas experiment. The frequency responses of the microbeam at the above-mentioned conditions are plotted in FIGS. 11A and 11B. The phase slope of the linear branch in FIG. 11B is determined to be |dϕ/df|=0.00169 [°/Hz].

Figure 11C:
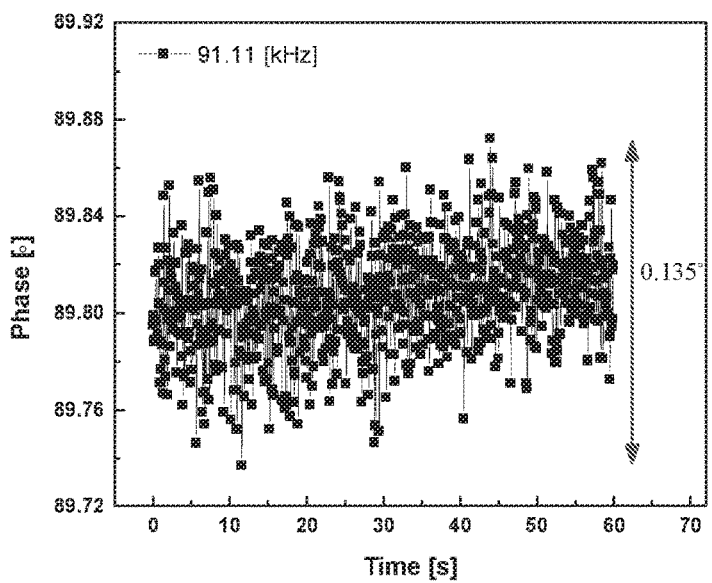
FIGS. 11C-11E illustrate noise analysis graphs, including variation of phase at fixed frequencies of 91.11 kHz, 91.17 kHz, and 91.21 kHz as a function of time, respectively, according to various embodiments described herein.
Figure 11D:
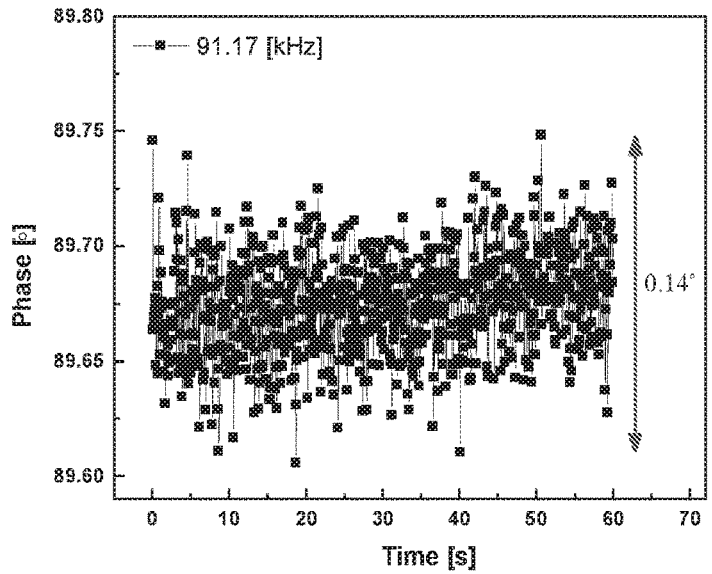
Figure 11E:
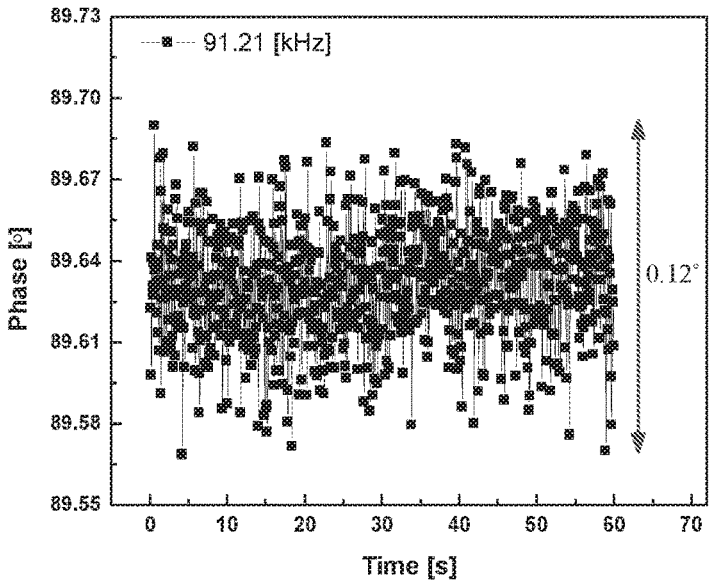

The phase evolution in time is performed for different operating frequencies in order to investigate the most stable frequency range. FIGS. 11C-11E illustrate noise analysis graphs, including variation of phase at a fixed frequencies of 91.11 kHz, 91.17 kHz, and 91.21 kHz as a function of time, respectively. In FIGS. 11C-11E, the phase variation is determined to be equal to dϕ=0.139°, dϕ=0.14°, and dϕ=0.12° for the operating frequencies of 91.11 kHz, 91.17 kHz, and 91.21 kHz, respectively. Using the calculated slope, the frequency shifts due to noise are determined to be 79.88 [Hz], 82.84 [Hz] and 71 [Hz] for the phase variations in FIGS. 11C-11E, respectively. Based on the previous frequency stability investigation, the stable zone is demonstrated to be within almost 80 [Hz] from the jumping frequency 91.22 [kHz] to successfully perform the switching operation.

In other aspects of the embodiments, a new switching technique is described based on the nonlinear response of the microbeam outlined above. Two kinds of switches have been introduced previously, and the jump-down switch mechanism is described next. To demonstrate the jump-down switch, a microcontroller is electrically connected to the gas sensing setup, and it should be appreciated that any suitable microcontroller can be used. The output from the data acquisition (e.g., the vibrometer) is connected to the microcontroller. A C++ or other suitable program is developed to read the voltages or other signals coming from the laser doppler vibrometer at a fixed frequency. The algorithm is based on calculating the amplitude difference between two successive points during a frequency sweep. When the absolute value of the difference between the current and previous data point exceeds a defined constant, switching is triggered.

Figure 12:
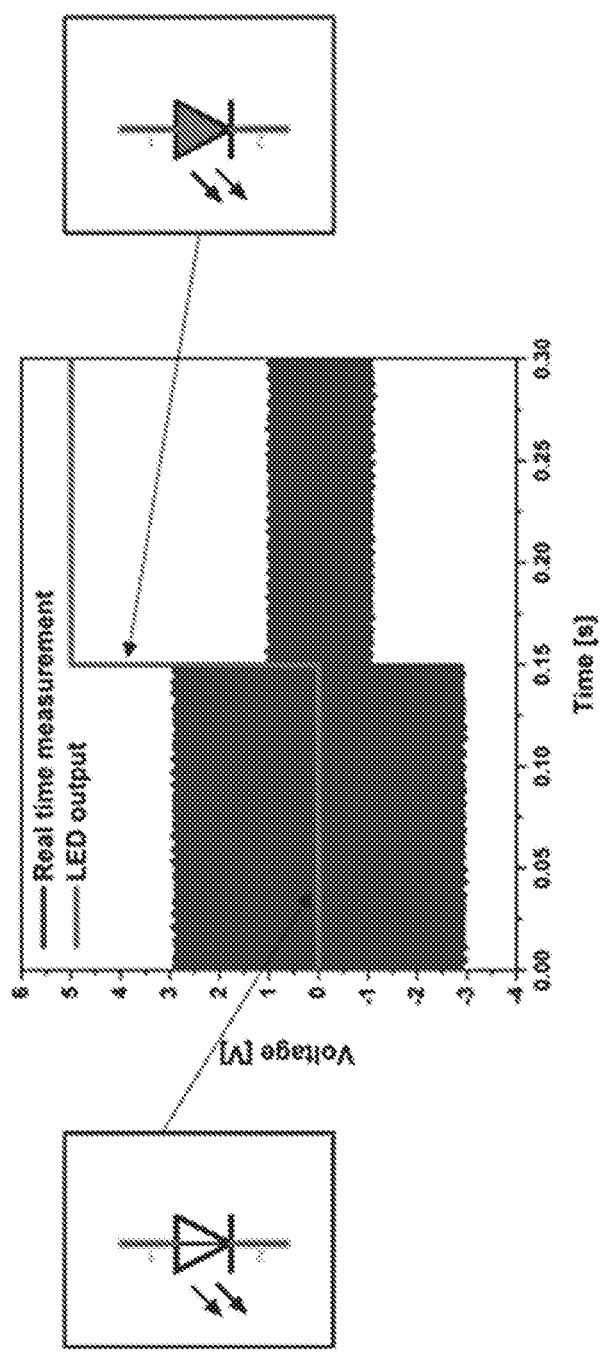
FIG. 12 illustrates a real time measurement and corresponding light emitting diode trigger according to various embodiments described herein.

FIG. 12 illustrates a real time measurement and corresponding light emitting diode (LED) trigger according to various embodiments described herein. As noted above, an LED can be connected to a digital output of the microcontroller to indicate the switching upon gas adsorption. As shown in FIG. 12, the output voltage of the LED is tracked in a separate waveform. When the jump occurs, the voltage rises from 0 to 5V, which represents the switching phenomenon.

Figure 13:
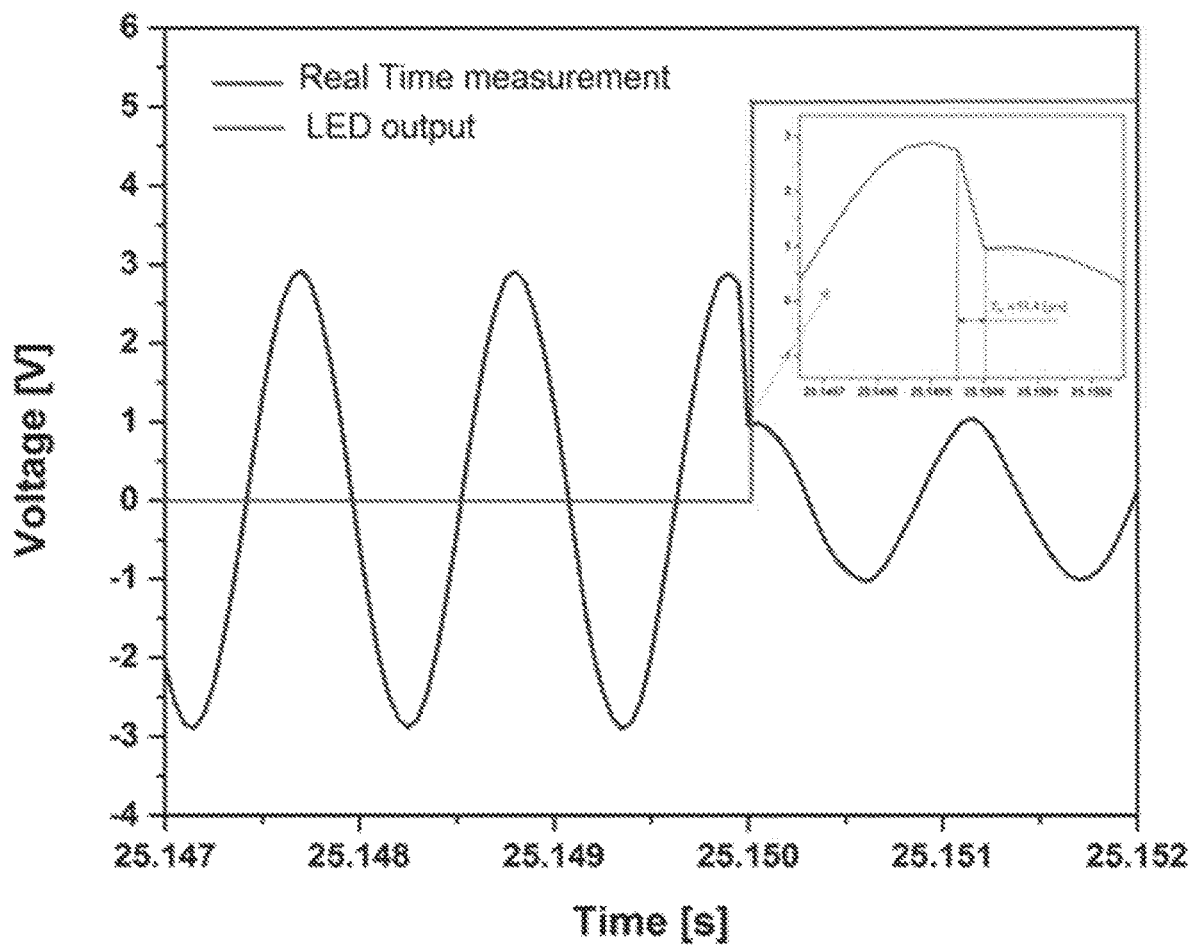
FIG. 13 illustrates another real time measurement and corresponding light emitting diode trigger according to various embodiments described herein.

FIG. 13 illustrates another real time measurement and corresponding light emitting diode trigger according to various embodiments described herein. In the context of FIG. 13, it is noted that one of the most important characteristics of a switch is its rise time response, which is the required time to change from one state to another. The rise time of the switch studied herein is $T_1=3.4$ [µs], which is the speed of the output pin of the microcontroller. The value of $T_1$ is related only to the microcontroller performance, which is responsible to send the action upon exceeding certain threshold. Another constant can be determined from FIG. 13, which is related to the microbeam and the implemented algorithm is found to be equal to $T_2=51.4$ [µs] for an amplitude difference equal to dY=0.1 [µm]. This time constant reveals how much time is needed to send the information from the switch to the controller. Thus, the total time required to execute an action using the proposed switch is almost $T_{total}=55$ [µs]. This time value can be minimized using a more optimized algorithm in order to detect lower jump distance. Scaling the microbeam resonator down will also lead to a faster switch and more sensitive electronic nose.

Aspects of the embodiments can be performed or executed by processing circuitry, including one or more microcontrollers, microprocessors, and/or general purpose computers. The processing circuitry can include one or more processors, Random Access Memories (RAMs), Read Only Memories (ROMs), other memory devices, local and/or area networks and interfaces, and an Input Output (I/O) interfaces.

The processors can comprise any suitable general purpose arithmetic processor and/or processing circuitry. The RAM and ROM can comprise any suitable random access or read only memory devices that store computer-readable instructions to be executed by the processor. Similarly, the memory devices can store computer-readable instructions thereon that, when executed by the processor, direct the processor to execute various aspects of the embodiments described herein. As a non-limiting example group, the memory devices can comprise one or more of an optical disc, a magnetic disc, a semiconductor memory (i.e., a magnetic, floating gate, or similar semiconductor-based memory), a magnetic tape memory, a removable memory, combinations thereof, or any other known memory means for storing computer-readable instructions.

In some embodiments, one or more of the processors can comprise an Application Specific Integrated Circuit (ASIC), Field Programmable Gate Array (FPGA), state machine, or other specific-purpose or embedded processing circuitry. In that case, the processes described herein can be executed by the specific-purpose circuitry according to an embedded circuitry design, by firmware, by the execution of computer-readable instructions, or a combination thereof.

In one aspect, among others, a system comprises a microelectromechanical system (MEMS) microbeam device; an instrument to measure structural vibrations of the MEMS microbeam device over time; and a processing circuit coupled to the instrument and configured to: conduct an analysis of the structural vibrations of the MEMS microbeam device; and detect a change in a response behavior of the MEMS microbeam device based on the analysis. In one or more aspects, the MEMS microbeam device can be coated with a Metal-Organic Framework (MOF) layer. The MOF layer can comprise an HKUST-1 MOF layer. The change in the response behavior of the MEMS microbeam device can comprise a mass-induced change in the response behavior. The MEMS microbeam device is operated at an operating pressure and at an operating voltage to induce at least one of a softening nonlinear response behavior or a hardening nonlinear response behavior of the MEMS microbeam device.

In one or more aspects, the processing circuit can be further configured to track a frequency response of the structural vibrations of the MEMS microbeam device over time. The processing circuit can be further configured to quantify a mass captured by the MEMS microbeam device based on a frequency shift of the structural vibrations of the MEMS microbeam device over time. The processing circuit can be further configured to trigger a switch based on a difference in a frequency response of the structural vibrations of the MEMS microbeam device over time.

In another aspect, a method comprises operating a microelectromechanical system (MEMS) microbeam device at an operating pressure and at an operating voltage; measuring structural vibrations of the MEMS microbeam device over time; conducting an analysis of the structural vibrations of the MEMS microbeam device; and detecting a change in a response behavior of the MEMS microbeam device based on the analysis. In one or more aspects, the MEMS microbeam device is coated with a Metal-Organic Framework (MOF) layer. The MOF layer can comprise an HKUST-1 MOF layer. The change in the response behavior of the MEMS microbeam device can comprise a mass-induced change in the response behavior.

In one or more aspects, the method can further comprise operating the MEMS microbeam device to induce at least one of a softening nonlinear response behavior or a hardening nonlinear response behavior of the MEMS microbeam device. The method can further comprise tracking a frequency response of the structural vibrations of the MEMS microbeam device over time. The method can further comprise quantifying a mass captured by the MEMS microbeam device based on a frequency shift of the structural vibrations of the MEMS microbeam device over time. The method can further comprising triggering a switch based on a difference in a frequency response of the structural vibrations of the MEMS microbeam device over time.

In another aspect, a method comprises forming a sacrificial layer over at least one lower electrode, the sacrificial layer comprising anchor passages extending through the sacrificial layer to the at least one lower electrode; forming an upper electrode on the sacrificial layer, the upper electrode contacting the lower electrode through the anchor passages; forming a structural layer on the upper electrode; forming a protective layer on the structural layer; removing the sacrificial layer to release a microbeam comprising the upper electrode, the structural layer and the protective layer, the microbeam suspended by anchors defined by the anchor passages; and coating the microbeam with a Metal-Organic Framework (MOF) layer. In one or more aspects, the upper electrode can comprise a first chromium layer, a gold layer disposed on the first chromium layer, and a second chromium layer disposed on the gold layer. The lower electrode can comprise a chromium layer and a gold layer. The structural layer can comprise polyimide. The protective layer can comprise nickel. The MOF layer can comprise an HKUST-1 MOF layer.

In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a microelectromechanical system (MEMS) microbeam device;
an instrument to measure structural vibrations of the MEMS microbeam device over time; and
a processing circuit coupled to the instrument and configured to:
select an operational frequency $f_{operating}$ that is applied to the MEMS microbeam device, wherein the operational frequency $f_{operating}$ is different from a jump frequency $f_{Jump}$ of the MEMS microbeam device, the MEMS microbeam device is characterized by a frequency response curve that has a linear part and a softening or hardening part, the jump frequency $f_{Jump}$ corresponds to a jump in the frequency between the linear part and the softening or hardening part, and the operational frequency $f_{operating}$ is selected to be in the linear part;
track an amplitude of vibrations of the MEMS microbeam device while the MEMS microbeam device is exposed to a gas;
detect a change in amplitude behavior of the MEMS microbeam device, which is associated with the jump frequency $f_{Jump}$ as a mass of the MEMS microbeam device increases due to the gas contacting the MEMS microbeam device; and
calculate a mass of the gas attached to the MEMS microbeam device based on (1) a responsivity of the MEMS microbeam device, and (2) a frequency difference between (a) the operational frequency $f_{operating}$ and (b) the jump frequency $f_{Jump}$ of the MEMS microbeam device.

2. The system of claim 1, wherein the MEMS microbeam device is coated with a Metal-Organic Framework (MOF) layer.

3. The system of claim 2, wherein the MOF layer comprises an HKUST-1 MOF layer.

4. The system of claim 1, wherein the change in the amplitude behavior of the MEMS microbeam device is associated with the linear part of the frequency response curve, and a ratio of (a) the change in amplitude and (b) the frequency difference is a slope of the linear part.

5. The system of claim 1, wherein the MEMS microbeam device is operated at an operating pressure and at an operating voltage to induce at least one of a softening nonlinear response behavior or a hardening nonlinear response behavior of the MEMS microbeam device.

6. The system of claim 1, wherein the processing circuit is further configured to track a frequency response of the structural vibrations of the MEMS microbeam device over time.

7. The system of claim 1, wherein the processing circuit is further configured to quantify a mass captured by the MEMS microbeam device based on the frequency difference of the MEMS microbeam device over time multiplied by an inverse of the responsivity.

8. The system of claim 1, wherein the processing circuit is further configured to trigger a switch based on a difference in a frequency response of the structural vibrations of the MEMS microbeam device over time.

9. A method, comprising:
operating a microelectromechanical system (MEMS) microbeam device at an operating pressure and at an operating voltage;
measuring structural vibrations of the MEMS microbeam device over time;
selecting an operational frequency $f_{operating}$ that is applied to the MEMS microbeam device, wherein the operational frequency $f_{operating}$ is different from a jump frequency $f_{Jump}$ of the MEMS microbeam device, the MEMS microbeam device is characterized by a frequency response curve that has a linear part and a softening or hardening part, the jump frequency $f_{Jump}$ corresponds to a jump in the frequency between the linear part and the softening or hardening part, and the operational frequency $f_{operating}$ is selected to be in the linear part;
conducting an analysis of the structural vibrations of the MEMS microbeam device based on a linear equation that relates an amplitude of the structural vibrations to a frequency from the linear part; and
detecting a frequency difference between the operational frequency $f_{operating}$ and the jump frequency $f_{Jump}$ of the MEMS microbeam device based on the linear equation.

10. The method of claim 9, wherein the MEMS microbeam device is coated with a Metal-Organic Framework (MOF) layer.

11. The method of claim 10, wherein the MOF layer comprises an HKUST-1 MOF layer.

12. The method of claim 9, wherein the frequency difference of the MEMS microbeam device is used to calculate a mass-induced change in the MEMS microbeam due to gas sensing.

13. The method of claim 9, further comprising operating the MEMS microbeam device to induce at least one of a softening nonlinear response behavior or a hardening nonlinear response behavior of the MEMS microbeam device.

14. The method of claim 9, further comprising tracking a frequency response of the structural vibrations of the MEMS microbeam device over time.

15. The method of claim 14, further comprising quantifying a mass captured by the MEMS microbeam device based on the frequency difference of the MEMS microbeam device over time and a responsivity of the MEMS microbeam device.

16. The method of claim 14, further comprising triggering a switch based on a difference in a frequency response of the structural vibrations of the MEMS microbeam device over time.

* * * * *